United States Patent
Charbit et al.

(10) Patent No.: US 9,007,992 B2
(45) Date of Patent: Apr. 14, 2015

(54) RELAYING IN A COMMUNICATION SYSTEM

(75) Inventors: IGilles Charbit, Farmborough (GB);
Hai Ming Wang, Beijing (CN); Erlin Zeng, Beijing (CN); Bernhard Raaf, Neuried (DE)

(73) Assignee: Nokia Corporation, Espoo (FI)

( * ) Notice: Subject to any disclaimer, the term of this patent is extended or adjusted under 35 U.S.C. 154(b) by 967 days.

(21) Appl. No.: 13/129,908

(22) PCT Filed: Nov. 18, 2008

(86) PCT No.: PCT/EP2008/065768
§ 371 (c)(1),
(2), (4) Date: May 18, 2011

(87) PCT Pub. No.: WO2010/057521
PCT Pub. Date: May 27, 2010

(65) Prior Publication Data
US 2011/0222428 A1   Sep. 15, 2011

(51) Int. Cl.
*H04W 56/00*   (2009.01)
*H04W 16/26*   (2009.01)
*H04B 7/155*   (2006.01)
*H04B 7/26*   (2006.01)
*H04W 76/02*   (2009.01)

(52) U.S. Cl.
CPC .......... *H04W 16/26* (2013.01); *H04B 7/15557* (2013.01); *H04B 7/2606* (2013.01); *H04W 76/025* (2013.01)

(58) Field of Classification Search
None
See application file for complete search history.

(56) References Cited

U.S. PATENT DOCUMENTS

| | | | |
|---|---|---|---|
| 2004/0062214 A1 | 4/2004 | Schnack et al. | |
| 2006/0153132 A1* | 7/2006 | Saito | 370/329 |
| 2006/0166618 A1* | 7/2006 | Bakaimis | 455/11.1 |
| 2007/0109962 A1* | 5/2007 | Leng et al. | 370/229 |
| 2008/0108369 A1* | 5/2008 | Visotsky et al. | 455/455 |
| 2008/0267113 A1* | 10/2008 | Lim et al. | 370/315 |
| 2009/0191882 A1 | 7/2009 | Kovacs et al. | |

(Continued)

FOREIGN PATENT DOCUMENTS

| | | |
|---|---|---|
| EP | 1806945 A2 | 7/2007 |
| EP | 2180741 A1 | 4/2010 |

OTHER PUBLICATIONS

"Discussion on L3 Relay for LTE-A", 3GPP TSG RAN WG1 Meeting #55, R1-084174, Agenda Item: 11.5, Samsung, Nov. 10-14, 2008, 8 pages.

(Continued)

*Primary Examiner* — Eunsook Choi
*Assistant Examiner* — Duc Duong
(74) *Attorney, Agent, or Firm* — Nokia Corporation

(57) ABSTRACT

A communication link is provided between a station of an access system and a relay node. The relay node is a node capable of wirelessly communicating with at least one communication device within the coverage thereof. A set up procedure for the communication link is initiated such that the relay node acts as a communication device towards the station, the set up procedure being initiated according to a set up procedure between the station and communication devices accessing the station directly. Communication between the relay node and at least one communication device within the coverage area thereof are handled such that the relay nodes acts as a station of an access system towards said at least one communication device.

16 Claims, 6 Drawing Sheets

Fig. 1

(56) References Cited

U.S. PATENT DOCUMENTS

| | | | |
|---|---|---|---|
| 2009/0221288 A1* | 9/2009 | Zhang et al. | 455/434 |
| 2010/0087196 A1* | 4/2010 | Lee et al. | 455/436 |
| 2010/0317284 A1* | 12/2010 | Charbit et al. | 455/7 |
| 2011/0096715 A1* | 4/2011 | Park et al. | 370/315 |
| 2013/0010679 A1* | 1/2013 | Ma et al. | 370/315 |

OTHER PUBLICATIONS

"Discussion on L3 Relay for LTE-A", 3GPP TSG RAN WG1 meeting #54, R1-082885, Agenda Item: 12, Samsung, Aug. 18-22, 2008, 8 pages.
"A Discussion on Some Technology Components for LTE-Advanced", TSG-RAN WG1 #53, R1-082024, Agenda Item: 6.2, Ericsson, May 5-9, 2008, 11 pages.
"Requirements for LTE Advanced", REV-080006, Panasonic, Apr. 7, 2008, pp. 1-5.
"Technical Proposals and Considerations for LTE Advanced", 3GPP TSG RAN WG1 Meeting #53, R1-081791, Kansas City, USA, Panasonic, May 5-9, 2008, pp. 1-16.
"Wireless Relaying for the LTE Evolution", TSG-RAN WG1 #54bis, R1-083752, Agenda Item: 11, Prague, Czech Republic, Ericsson, Sep. 29-Oct. 3, 2008, 3 pages.
"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331, v8.2.0, May 2008, pp. 1-151.
"Text Proposal for Evaluation Methodology", 3GPP TSG-RAN WG1 #54bis, R1-083807, Agenda Item: 11, Prague, Czech Republic, Sep. 29-Oct. 3, 2008, 8 pages.
"Impact of Planning on ENB—Relay Link Model", 3GPP TSG RAN WG1 Meeting #54bis, R1-083731, Agenda Item: 11, Study Item on LTE-Advanced, Prague, Czech Republic, Nokia Siemens Networks & Nokia Corporation, Sep. 29-Oct. 3, 2008, pp. 1-8.
"Discussion on L3 Relay for LTE-A", 3GPP TSG RAN WG1 meeting #54bis, R1-083568, Agenda Item: 11, Prague, Czech Republic, Samsung, Sep. 29-Oct. 3, 2008, 8 pages.
"Discussion on the TD Relay and FD Relay for FDD System", 3GPP TSG RAN WG1 Meeting #54bis, R1-083676, Agenda Item: 11 Study Item on LTE-Advanced, Prague, Czech Republic, Panasonic, Sep. 29-Oct. 3, 2008, pp. 1-5.

"3rd Generation Partnership Project; Technical Specification Group Radio Access Network; Evolved Universal Terrestrial Radio Access (E-UTRA); Physical Channels and Modulation (Release 8)", 3GPP TS 36.211, v8.4.0, Sep. 2008, pp. 1-78.
"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331, v8.4.0, Dec. 2008, 1-198.
"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321, v8.4.0, Dec. 2008, 1-43.
"Application Scenarios for LTE-Advanced Relay", TSG-RAN WG1 #54, R1-082975, Agenda Item: 12 Study Item on LTE-Advanced, Jeju, Korea, Aug. 18-22, 2008, pp. 1-7.
International Search Report and Written Opinion received for corresponding Patent Cooperation Treaty Application No. PCT/EP2008/065768, dated Aug. 18, 2009, 10 pages.
"L2 Relay Interference Mitigation", 3GPP TSG RAN WG1 Meeting #55, R1-084102, Agenda Item: 11.5, Research in Motion Limited, Prague, Czech Republic, Nov. 10-14, 2008, pp. 1-6.
"ODMA Routeing With Procedures for Mobile Originated Calls, Mobile Terminated Calls and Location Update", 3GPP TSG RAN WG1#3, TSGR1 #3(99)289, Agenda Item: 9.8, Vodafone, Nynashamn, Sweden, Mar. 22-26, 1999, 12 pages.
Schultz et al., "On the Integration of Relaying in the Winner MAC", In Proceedings of 16th Wireless World Research Forum, Apr. 2006, pp. 1-6.
"LTE Signaling to Support Relay Operation", 3GPP TSG RAN WG1 Meeting #55, RI-084412, Agenda Item: 11.5, Motorola, Prague, Czech Republic, Nov. 10-14, 2008, 6 pages.
"3rd Generation Partnership Project; Technical Specification Group Radio Access Network; Further Advancements for E-UTRA Physical Layer Aspects (Release X)", Draft 3GPP TR 36.814, v.0.0.1, Sep. 2008, pp. 1-8.
Office action received for corresponding Chinese Application No. 200880131982.0, dated Mar. 25, 2014, 6 pages of office action, No English Language Translation available.
Office Action received for corresponding Chinese Application No. 200880131982.0, dated Jul. 2, 2013, 23 pages.
Office action received for corresponding Chinese Application No. 200880131982.0, dated Oct. 11, 2014, 7 pages of office action and no page of English Language Translation available.

* cited by examiner

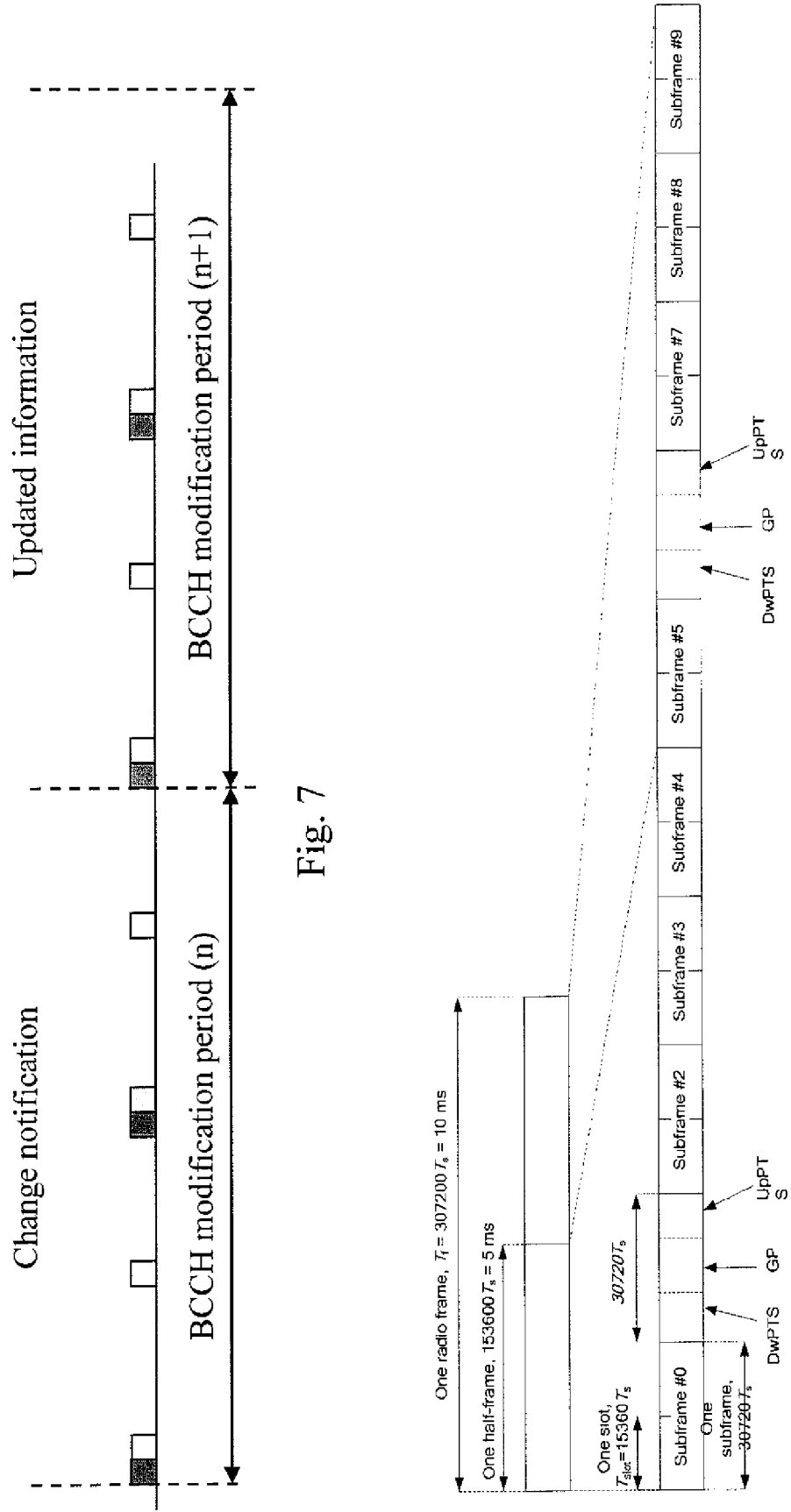

RELAYING IN A COMMUNICATION SYSTEM

RELATED APPLICATION

This application was originally filed as PCT Application No. PCT/EP2008/065768 filed on 18 Nov., 2008, which is incorporated herein by reference in its entirety.

The invention relates to relay links in a communication system, and more particularly but not exclusively to setting up and control of a relay link between a station and a relaying station.

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the standard or specification may define if a communication device is provided with a circuit switched carrier service or a packet switched carrier service or both. Communication protocols and/or parameters which shall be used for the connection are also typically defined. For example, the manner how the communication device can access the communication system and how communication shall be implemented between communicating devices, the elements of the communication network and/or other communication devices is typically based on predefined communication protocols.

In a wireless communication system at least apart of the communication between at least two stations occurs over a wireless link. Examples of wireless systems include public land mobile networks (PLMN), satellite based communication systems and different wireless local networks, for example wireless local area networks (WLAN). The wireless systems can be divided into cells, and are therefore often referred to as cellular systems.

A user can access the communication system by means of an appropriate communication device. A communication device of a user is often referred to as user equipment (UE). A communication device is provided with an appropriate signal receiving and transmitting arrangement for enabling communications with other parties. Typically a communication device is used for enabling the users thereof to receive and transmit communications such as speech and data. In wireless systems a communication devices provides a transceiver station that can communicate with e.g. a base station of an access network providing at least one cell and/or another communications device. Depending on the context, a communication device or user equipment may also be considered as being a part of a communication system. In certain applications, for example in adhoc networks, the communication system can be based on use of a plurality of user equipment capable of communicating with each other.

The communication may comprise, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast content. Non-limiting examples of the content include downloads, television and radio programs, videos, advertisements, various alerts and other information.

$3^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced. The LTE-Advanced aims to provide further enhanced services by means of even higher data rate and lower latency with reduced cost. The various development stages of the 3GPP LTE specifications are referred to as releases.

Since the new spectrum bands for international mobile telecommunications (IMT) contain higher frequency band and LTE-Advanced is aiming at higher data rate, coverage of one Node B can be limited due to the high propagation loss and limited energy per bit. Relaying has been proposed as a possibility to enlarge the coverage. Apart from this goal of coverage extension, introducing relay concepts may also help in provision of high-bit-rate coverage in high shadowing environment, reducing average radio-transmission power at the User Equipment (UE), thereby leading to long battery life enhancing cell capacity and effective throughput, e.g., increasing cell-edge capacity and balancing cell load and enhancing overall performance and deployment cost of radio access networks (RAN). The relaying would be provided by entities referred to as Relay stations (RSs) or Relay Nodes (RNs). The relay nodes can be fixed or mobile, for example mounted to a high-speed train. In some systems the relay stations may be opportunistically available user equipments/mobile terminals that are not owned by the network itself.

Thus it can be contemplated that for future LTEs standard releases, releases 9 and upwards, relay nodes (RNs) are provided.

Backward compatibility of LTE-Advanced with earlier versions of the LTE would be desired. In its initial network development phase, building cost-effective coverage with relaying solution may be an attractive proposition for network operators. For this reason, the design of non-transparent relay concept with backward-compatibility with the existing LTE compatible devices, for example with devices known as LTE release 8 compatible user equipment (R8 UE) would be desired. Also, at the network side software and even hardware updates should preferably be as small as possible.

Relaying may be realized at the different layers of the protocol stack. An example of simple amplify/forward relaying (Amplify and/or forward relaying) may be realized at the L1 (Network Layer 1, Physical Layer) of the protocol stack where the relay may only have at least some part of the Physical Layer (PHY layer). Decode/forward (decode and/or forward) L2 (Network Layer 2, Data Link Layer) RNs (Relay Nodes), which may comprise the relaying protocol stack up to the MAC (Medium Access Control)/RLC (Radio Link Control) layers, may enable the possibility of doing decentralized radio resource management. L3 (Network Layer 3, Network Layer) or higher layer RNs could almost be considered as wireless base stations and may support substantially all the protocol layers of normal base stations. L3 or higher layer relaying is used in this text as an example. The L3 Relay is accessible to a release 8 compatible user equipment and provides its own downlink (DL) common and shared control signalling to allow user equipments to access a L3 relay cell, as would be the case for a traditional cell.

In accordance with a proposal donor cells can be provided. These are cells that "donate" resources for relaying purposes. These resources are typically used to provide wireless backhauling for the relay. It has been proposed that a donor cell for layer 3 (L3 of the protocol stack: Radio Resource Control RRC layer) relay can be provided with self-backhauling. The principle of backhauling between a relay node and a donor cell is illustrated in FIG. 1. It is noted that a cell in the FIG. 1 example refers to a sector. In such an arrangement the L3 relay node 10 is wirelessly connected to the rest of the radio access system via the "donor" cell by means of self-backhauling, i.e. the communication is relayed via another cell. Typically, although not necessarily, the donor cell can provide a larger coverage than the cell the user equipment is attached to The "L3 relay" node of this example is an eNB 10 supporting one or more cells of its own. The downlink control signalling between the eNB 10 and the user equipment 1 can comprise channels such as Primary Synchronisation Channel (P-SCH), Secondary Synchronisation Channel (S-SCH), Physical Broadcast CHannel (P-BCH) and Common Reference signal (CRS).

As shown in FIG. 1, the L3 relay is typically, although not necessarily, placed outside the eNB donor cell coverage for UEs with self-backhaul. The S1 and X2 interfaces between the base stations can make use of wireless inband or outband resources. The self-backhaul can be provided via inband resources with significant link gains due to for example antenna tilting and adequate positioning of the relay to minimise shadowing loss. This provides flexibility for network operators but uses bandwidth for the self-backhauling depending on how many user equipments are connected to the L3 relay node and the traffic load. The self-backhaul can also be provided by means of outband resources with a more powerful amplifier for the eNB-L3 relay link. This makes backhaul link an add-on to conventional eNB, but may require operators to have IMT-A spectrum and may complicate network deployments due to varying IMT-A spectrum allocations worldwide. This may add cost to the L3 relay and also to the donor cell.

It has been suggested that use of in-band resources for L3 relay means L3 relay needs to listen to P/S-SCH, CRS, and P-BCH from e-NB to find out about eNB resources allocated to the link between the eNB and the relay node (eNB-RN link). The relay node also needs to transmit its own P/S-SCH, CRS, and P-BCH signalling for the relay-connected user equipments for the backward compatibility. In LTE this signalling would occur on mid-6 Physical Resource Blocks (PRBs), or include the mid-6 PRBs. This is illustrated in FIG. 2, where only the system information scenario is shown, see the P-BCH and scheduling Unit 1 (SU-1).

This may be difficult from the point of view of the hardware (HW) implementation, as it is a commonly held view that a device may not on the one hand receive a signal at a relatively low received power, e.g. of −100 dBm, and on the other hand at the same time transmit on the same carrier a signal at relatively large transmit power, e.g. of +30 dBm. Decoupling between the receiver (Rx) and transmitter (Tx) paths is considered as being a too formidable a task if the aim is to provide a cost-effective transceiver design.

Another problem may arise from the interference between the common and shared signalling transmitted by the base station of the donor cell and the common and shared signalling by the relay node. This interference should be kept at a low level, and preferably minimised, to prevent significant common and shared signalling detection deterioration in the user equipments attached to either to the base station of the donor cell or the relay node.

Shifting the relay node P-BCH transmission with an offset, e.g. an offset of a 1 ms offset or 2 ms, and shifting of the relay node CRS with e.g. a further 2 OFDM symbol offset has been proposed to address these issues. The shifting might be considered for FDD, although with some drawbacks, but this is not believed to be possible for TDD due to uplink/downlink (UL/DL) slot configuration limitations and any additional time slot, such as for example the DwPTS, Guard Band, and UpPTS slots shown in FIG. 9. The shifting might not also be desirable as it is not compatible with synchronised networks, which is desirable feature for advanced LTE Frequency Division Duplex (FDD) operations. Also, a LTE Time Division Duplex (TDD) network needs synchronisation of eNBs and relay nodes to avoid near-far interference, where a user equipment (UE) on edge of the cell may be in transmission (Tx) mode while another user equipment attached to a neighbouring eNB or relay node is in receiving (Rx) mode.

It is noted that the above discussed issues are not limited to any particular communication environment, but may occur in any appropriate communication system where relaying may be provided.

What is needed is a solution to at least some of the above disadvantages and for avoiding, or at least mitigating, self-inference in a relay node.

Embodiments of the invention aim to address one or several of the above issues.

In accordance with an embodiment there is provided a method for providing a communication link between a station of an access system and a relay node, the relay node being capable of wirelessly communicating with at least one communication device within the coverage thereof, comprising initiating a set up procedure for the communication link, wherein the relay node acts as a communication device towards the station and the set up procedure is initiated according to a set up procedure between the station and communication devices accessing the station directly, and communicating between the relay node and at least one communication device within the coverage area thereof, wherein the relay nodes acts as a station of an access system towards said at least one communication device.

In accordance with an embodiment there is provided a method for providing a communication link between a station of an access system and a relay node, the relay node being capable of wirelessly communicating with at least one communication device within the coverage thereof, comprising initiating a set up procedure for the communication link, wherein the relay node is treated as a communication device accessing the station and the set up procedure is initiated according to a set up procedure between the station and communication devices accessing the station directly, setting up the communication link between the relay node and the station, and transmitting further information to the relay node via said communication link for maintaining the communication link.

In accordance with a yet another embodiment there is provided a method for providing a relaying link between a relay node and a station, comprising processing information regarding communication devices attached to the relay node, determining resource requirements based on the processing; and allocating resources for the relaying link based on the determining.

In accordance with further embodiments apparatus and/or computer program product that can be embodied on a computer readable medium for providing at least one of the above methods is provided.

In accordance with a more detailed embodiment method broadcast system information is communicated via the communication link.

Synchronization of the relay node with the station and/or vice versa may be maintained based on common reference signals transmitted on the communication link after the setup thereof.

Configuration parameters of the relay node may be updated based on broadcast system information communicated via the communication link.

The relay node can have at least two modes such that, when in a first mode, first information can be received via a broadcasting channel based on a protocol for communication between the station and communication devices within the coverage of the station, where after the relay node can be synchronised with the station based on said first information and the communication link can be set up. The relay node can then be switched to a second mode for enabling the relay node to transmit second information for communications devices within the coverage of the relay node. The synchronisation and configuration of the relay node may then be maintained based on third information received via the communication link. The first mode may enable the relay node to receive system information on a broadcast control channel and the second mode may enable the relay node to transmit system information on the broadcast control channel. The system information may be received and transmitted on mid 6 physical resource blocks on the broadcast control channel.

Communicating on the communication link may be based on frequency division duplex (FDD) and/or time division duplex (TDD) transmissions.

The uplink timing of relay node attached communication devices may be aligned to the station. The timing advance on the communication link may be set such that communication devices attached to the relay node are in alignment with the station.

A relay-specific system information message may be transmitted within a Broadcast Control Channel (BCCH) notification period.

A timing advance parameter may be determined and communicated to a communication device for use in compensating a delay cause by the relaying.

Processing of data may further comprise taking into account data buffered for sending on the communication link. Average of packets per a new resource request may be computed. It is possible to determine whether there is an unbalance between resources allocated for the communication link and the data communicated between the relay node and the communication devices.

Various other aspects and further embodiments are described in the following detailed description and in the attached claims.

The invention will now be described in further detail, by way of example only, with reference to the following examples and accompanying drawings, in which:

FIG. 7 is an illustration of a Broadcast Control Channel (BCCH) notification period FIG. 9 shows an example of a frame structure for a radio frame.

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIGS. 1, 3 and 4 to assist in understanding the embodiments.

A communication device can be used for accessing various services and/or applications provided via a communication system. In wireless or mobile communication systems the access is provided via an access interface between mobile communication devices 1 and an appropriate wireless access system 12. A mobile communication device 1 can typically access wirelessly a communication system via at least one base station 10 or similar wireless transmitter and/or receiver node of the access system 12. The communication devices can access the communication system based on various access techniques, such as code division multiple access (CDMA), or wideband CDMA (WCDMA), the latter technique being used by communication systems based on the third Generation Partnership Project (3GPP) specifications. Other examples include time division multiple access (TDMA), frequency division multiple access (FDMA), space division multiple access (SDMA) and so on. In a wireless system a network entity such as a base station provides an access node for communication devices.

Non-limiting examples of appropriate access nodes are a base station of a cellular system, a base station of a wireless local area network (WLAN) and/or WiMax (Worldwide Interoperability for Microwave Access). In certain systems the base station is referred to as Node B, or enhanced Node B (e-NB). Each mobile device 1 may have one or more radio channels open at the same time and may receive signals from more than one base station and/or other communication device.

A transceiver may need to be able to send and receive at the same time. This can be addressed by applying a multiplexing scheme to communications to and from a transceiver. Time-Division Duplex (TDD) is an application of time-division multiplexing where outward and return signals are separated based on time. It emulates full duplex communication over a half duplex communication link. In Frequency-division duplex (FDD) the transmitter and receiver operate at different carrier frequencies, and the uplink and downlink sub-bands are separated by the "frequency offset". Both of these techniques may be used by a transceiver.

A non-limiting example of mobile architectures where the herein described principles may be applied is known as the Evolved Universal Terrestrial Radio Access Network (E-UTRAN). The eNBs may provide E-UTRAN features such as user plane Radio Link Control/Medium Access Control/Physical layer protocol (RLC/MAC/PHY) and control plane Radio Resource Control (RRC) protocol terminations towards the user devices.

Figure 1:
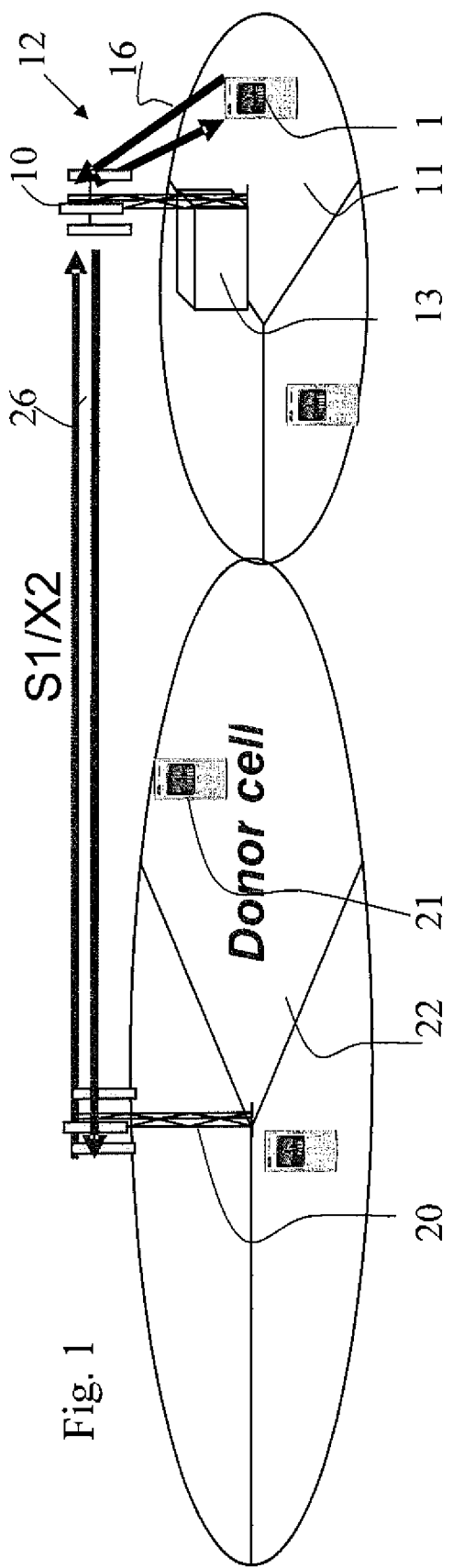
FIG. 1 shows an example of a communication system in which the embodiments of the invention may be implemented.
Figure 2:
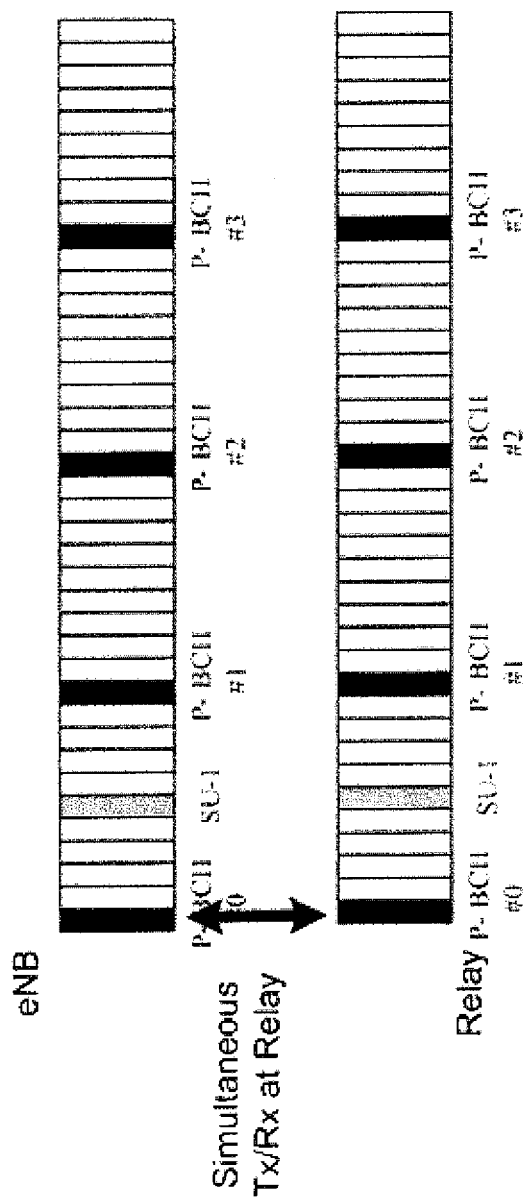
FIG. 2 illustrates self-interference as seen by a Physical Broadcast Channel (PBCH)

The base stations provide one or more cells of a cellular system. In the FIG. 1 example the base stations 10 and 20 are configured to provide three sectors, each sector providing a cell. In the example of FIG. 1 a cell 22 provided by the base station 20 is labelled as a donor cell. The relevance of the donor cell will be discussed in more detail below.

A base station is typically controlled by at least one appropriate controller entity so as to enable operation thereof and management of mobile communication devices in communication with the base station. The controller entity is typically provided with memory capacity and at least one data processor. The control entity can be interconnected with other control entities. In FIG. 1 the controller is shown to be provided by block 13. However, it shall be understood that the control functions may be distributed between a plurality of controller units.

Figure 3:
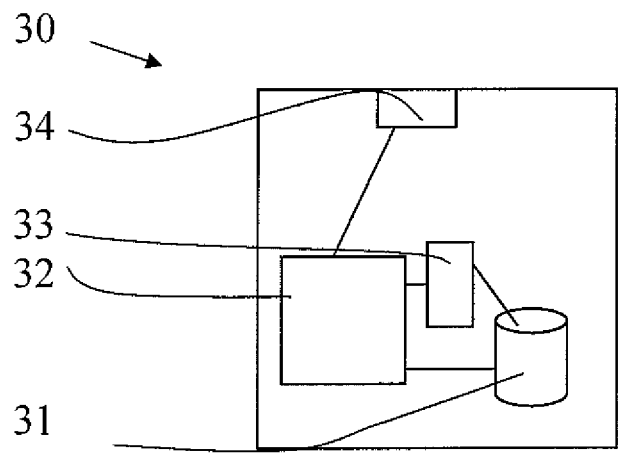
FIG. 3 shows an example of a controller for a base station.

FIG. 3 shows an example of a controller apparatus 30 comprising at least one memory 31, at least one data processing unit 32, 33 and an input/output interface 34. The controller may be configured to execute an appropriate software to provide the desired control function.

A gateway function between the access systems, the core network and/or another network such as a packet data network may be provided by means of appropriate gateway nodes.

Figure 4:
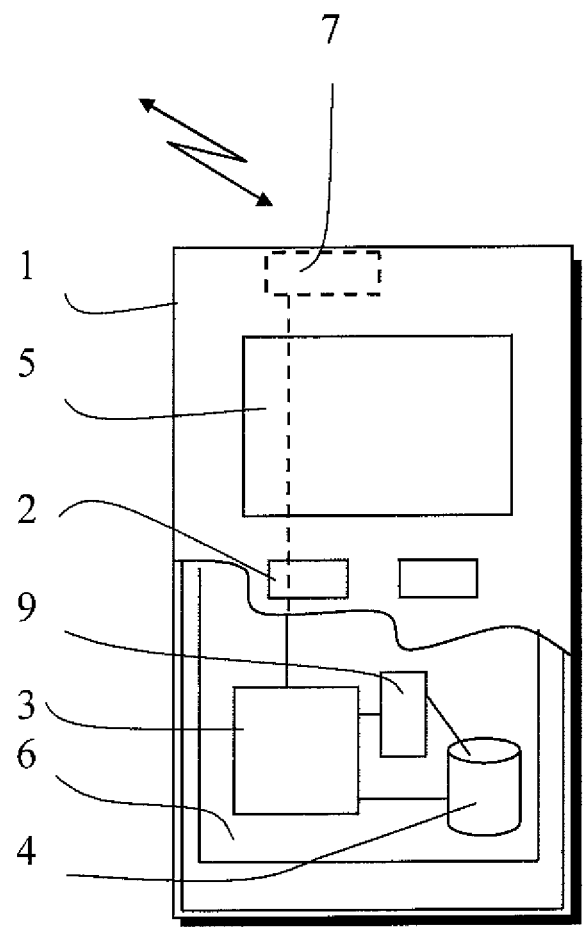
FIG. 4 shows a communication device.

FIG. 4 shows a schematic, partially sectioned view of a communication device 1 that can be used for communication with at least one base station of an access system. An appropriate mobile communication device may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like. A wireless mobile communication device is often referred to as a user equipment (UE).

A mobile communication device may be used for voice and video calls, for accessing service applications provided via a data network. The mobile device 1 may receive signals via an appropriate radio receiver of the mobile device. In FIG. 3 the receiver is designated schematically by block 7. The receiver may be provided for example by means of a radio part and associated antenna arrangement. The antenna arrangement may be arranged internally or externally to the mobile device. The receiver arrangement of the mobile device may be configured for enabling tuning to different carrier frequencies. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

FIG. 1 also shows a scenario where the base station 10 acts as a relay node between the user equipment 1 and the base station 20. Communications between the user equipment 1 and the base station/relay node 10 can be provided by a duplex link 16. Communications between the base station/relay node 10 and the base station 20 can be provided by means of a duplex link 26. In accordance with embodiment of the invention, a connection set up for the relaying where self-interference is avoided, or at least mitigated, in the relay node 10 is provided. In the connection set up phase between a station, for example the eNB 20 of FIG. 1, and the relay node 10 serving a user equipment 1 the relay node can behave like a user equipment when communicating with the donor cell 22. At the same time, or after the connection set up phase, the relay node can behave like a normal cell towards the user equipment (UE) 1 accessing the relay node directly. The connection can be set up using inband resources for the donor cell to relay node link, also referred to as the backhaul link, to provide efficient solution for self-backhauling.

Figure 5:
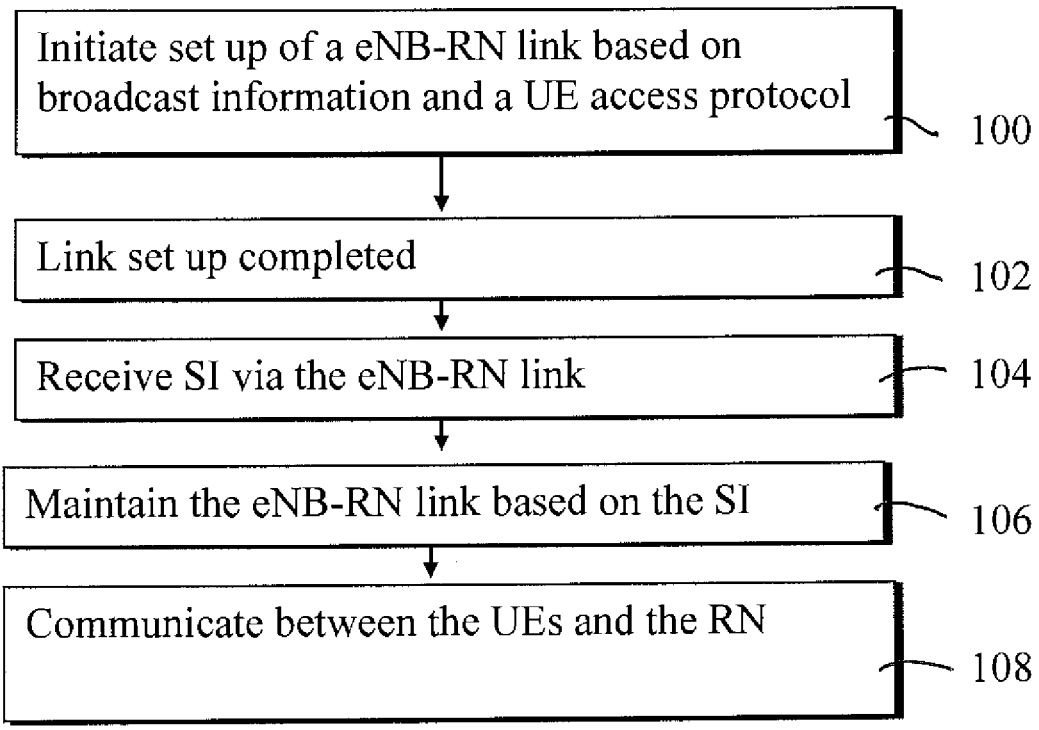
FIGS. 5 and 6 are flowcharts illustrating certain embodiments.

Operation of the relay node in accordance with an embodiment is illustrated by the flowchart of FIG. 5. As shown, a set up procedure for a communication link between the relay node and a station at a donor cell is initiated at 100. At this stage the relay node acts as a communication device towards the station of the donor cell. The set up procedure is initiated according to a set up procedure that would be used between the station 20 and communication devices 21 accessing the station directly in FIG. 1. At this stage the relay node may be in a first mode and receive first information via a broadcasting channel. The broadcasting can be received on the mid 6 Physical Resource Blocks (PRBs). The communications link 26 is eventually set up at 102, and the relay node 10 is synchronised with the station 20 of the donor cell 22 based on this information. This communications link can also be referred to as the backhaul link. The relay node can then receive system information from the station 20 broadcasted via the communications link at 104, and maintain the link based on the information at 106. The relay node can communicate at 108 with at least one communication device within the coverage area thereof. In this communication the relay nodes acts as a station of an access system towards said at least one communication device. The relay node may be switched to a second mode for enabling the relay node to transmit to the communications devices at 108 within the coverage of the relay node.

The relay node can maintain its synchronization with the station at 106 based on the in-band signalling such as common reference signals transmitted by the station 20 on the backhaul link 26. In addition, the relay node can update its configuration parameters based on system information broadcasted by the station 20 via the communications link after the set up thereof is completed at 104. The said first mode enables the relay node to receive system information on a broadcast control channel, for example on the mid 6 PRBs, at 100 and the second mode enables the relay node to transmit system information on the broadcast control channel at 108, for example on the mid 6-PRBs.

Figure 6:
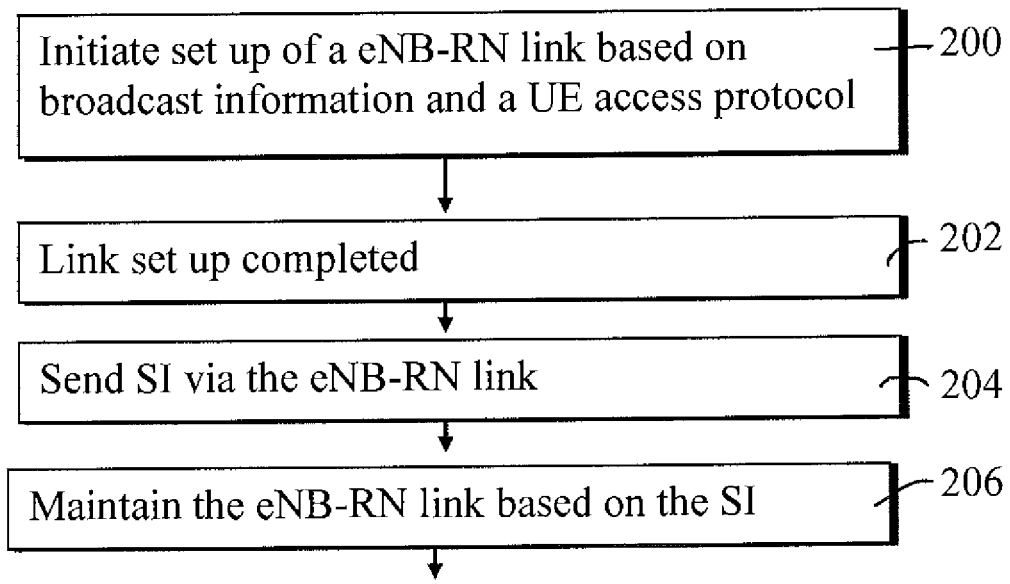

FIG. 6 is a flowchart showing an example for operation of the station of the donor cell. A set up procedure for the communication link is initiated at 200. At this stage the relay node is treated as a communication device accessing the station and the set up procedure is initiated according to a set up procedure between the station and communication devices accessing the station directly. The station continuously broadcasts system information for enabling, inter alia, synchronisation to the station and the link set up. The information can be broadcast on a broadcasting channel based on a protocol for communication between the station and communication devices within the coverage of the station. The communication link between the relay node and the station is set up and the station is synchronised with the relay node at 202. Further information is transmitted to the relay node at 204 via said communication link for maintaining the communication link at 206. This step may include sending specific additional signals and information to the relay node in order to provide synchronization and information in case the relay node is not able to receive this information, for example in the mid 6 PRBs.

In the embodiment change in the placement of existing LTE release 8 signalling, such as P-BCH, P/S-SCH and Common RS (i.e. Pilot) can be avoided. The layer 3 (L3) inband-relay node can be made transparent to the accessing user equipment (UE). That is, the UE does not need to be made aware of the existence of such a relay mechanism on the communications path. Therefore backward compatibility can be maintained. Also, new user equipments that could be made aware of different behaviours of relay nodes and donor base stations may not need to implement two procedures but can use the same approach universally. For example, existing LTE release 8 compatible P-BCH, P/S-SCH channels may not need to be changed. In the embodiment it is also possible to avoid the need of the relay node (RN) to constantly measure the donor cell to keep synchronization.

The following discusses more detailed examples of how a relay node (RN) can be enabled to receive updated system information from a station, for example a base station of a neighbouring cell. At the same time the relay node can also act as a base station and perform transmit and/or receive operations on the access link(s) between it and user equipment(s) within the coverage thereof. The relay node also performs transmit and/or receive operations on the backhaul link(s) between it and the donor cell(s). Hence, the relay node 10 can perform quadruplex relay frame operations for the backhaul link 26 and access link 16. Quadruplex in this content means operation of two duplex links i.e. in total 4 links.

Initially, the relay node (RN) 10 can act as a user equipment (UE) and perform an initial donor cell access procedure to achieve downlink (DL) synchronisation and to align its uplink (UL) transmission time with the station 20 of the donor cell 22. The station of the donor cell, for example an eNB 20, may provide a Broadcast Control Channel (BCCH) for carrying a repeating pattern of system information messages that describe the identity, configuration and available features of the base station. Thus the station 20 may broadcast necessary eNB-RN link configuration parameters on its Broadcast Control Channel (BCCH).

In accordance with a more particular example, the link configuration parameters may be carried within a BCCH notification period on System Information Block (SIB) on a Dynamic Broadcasting Channel (D-BCH) on mid-6 Physical Resource Blocks (PRBs). This can be provided by means of a relay-specific System Information message within a Broadcast Control Channel (BCCH) notification period. LTE Release 8 compatible user equipments possibly receiving this new SIB can simply ignore the new SIB as not relevant for release 8 UE configuration parameters.

In accordance with an embodiment an initial donor cell eNB-RN link setup procedure for a wireless backhaul link is provided such that it may be used for both FDD and TDD transmissions. The eNB 20 of the donor cell 22 may broadcast a RN-specific SIB and a UE-specific SIB to the eNB-synchronised relay node 10 on a Downlink Share Channel (DL-SCH) on dedicated physical resources allocated by the eNB 20 to the backhaul link. Hence, these SIBs can be broadcast by the eNB 20 on the mid 6-PRBs and also broadcasted to the relay node 10 on one or more backhaul links. This allows eNB-synchronised relay nodes to receive the eNB SIBs within a BCCH notification period though they are not in Rx-mode to eNB on mid-6 PRBs, but instead are in Tx-mode to the user equipments in the cell of the relay node 10 to allow the relay node to broadcast its own SIBs, i.e. also to transmit synchronisation channels and paging channels. This allows the relay node 10 to avoid, or at least mitigate, any problems related to quadruplex relay frames.

In a further embodiment a modified access procedure for the relay node may be provided. The modification relative to an access procedure of an ordinary user equipment in the donor cell may be such that the relay node is allowed to access a donor cell eNB even in occasions when the eNB is barred from access for ordinary user equipments in its area. A reason for allowing this is that during a "boot" phase of a network, when the network is being set up, the network may not yet accept user equipments and thus bars the cells via a parameter in its SIB signalling. However, it may be desirable in this situation to allow connections with relay nodes during that phase to make sure they are operational when user equipments are admitted. To provide this feature the relay nodes may be configured such that they ignore the barring status of the donor cell or obtain an individual barring information in a relay specific SIB.

In an embodiment, the eNB 20 may broadcast these SIBs using same subset of PRBs common to all the backhaul links as indicated by a relay node SIB. In an embodiment, the transmission of SIBs may differ from the transmission of ordinary SIBs in order to allow the relay to receive them despite transmitting for a significant time to the user equipment and thus not being able to receive from the eNB during that time. This may include transmission of the SIB in a shortened period, i.e. not transmit over the entire time of a subframe but only a part of such a subframe. In such occasion the part transmitted should correspond to the part that can be received by the relay node.

In an embodiment the relay configuration parameters can be used to indicate if transparent/non-transparent relay, Time Duplexing or Frequency Duplexing relay modes, repeater (L0), Amplify and Forward (L1), Decode and Forward (L2), self-backhauling (L3) relays, etc. are supported. The donor cell eNB 10 may change these in pseudo-static fashion to fit the use case.

In another embodiment, user equipment specific SIBs may be used by the relay node to optimise relay operations. This can be provided to provide information about the configuration parameters of the eNB-attached user equipments that may potentially interferer with the relay node attached user equipments.

The donor cell e-NB may allocate downlink (DL) and uplink (UL) grant resources to the relay node for donor cell eNB-RN link using semi persistent packet scheduling or dynamic packet scheduling in a complementing fashion depending on needs. The allocation may be based on information such as traffic load, number of user equipments attached to relay, information regarding the quality of the relay node-user equipment (RN-UE) links, different quality of service (QoS) requirements, and so on. The resources to be allocated to the backhaul link can be determined by a rate/flow control mechanism. The mechanism can take into account the realisable average data rates between the relay node and the user equipments. At the same time it can minimise the average buffer requirements for stored data that is intended to the user equipments but not yet delivered across the RN-UE link.

After the relay node 10 has synchronised with the donor cell eNB 20, configured itself with relay system parameters supported by the cell 22, and assigned resources for its wireless backhaul link 26, the relay node 10 may stop the receive mode in mid-6 PRBs and starts its own transmission of common and shared signalling to allow user equipments to perform initial relay node cell access procedure.

Inband resources for wireless backhaul over the link between the donor cell eNB and the relay node are considered to give good flexibility for operators and reduce the handling cost of setting up relays. This is so because there is no need for fibre-optic cable connection and no need for outband spectrum. The outband spectrum may not even be available to the operator or could be costly. In a preferred embodiment this is achieved without any impact on LTE release 8 compatible user equipment.

In the following an example for configuration of relay parameters by donor-cell eNB system information is disclosed. In accordance with a possibility the relay node 10 performs a cell access procedure similar to that done by an user equipment within the donor cell. For example, the relay node 10 can synchronise itself to donor cell eNB 20 by detecting the P-SCH and S-SCH transmitted by the donor cell eNB 20 in the mid-6 PRBs. The relay node may then read P-BCH information in the mid-6 PRBs to determine Random Access Channel (RACH) configuration and system information. For example, information about downlink (DL) system bandwidth, System Information Block (including frame index, subframe index, transport format of SIB), System Frame Number, Random Access Radio Network Temporary Identity (RA-RNTI) and so on can be obtained. The relay node 10 may then send a relay RACH to donor cell eNB 20 to allow donor cell eNB to synchronise to the relay. The donor cell eNB may then send a Physical Downlink Control Channel (PDCCH) with RA-RNTI to indicate Downlink Shared Channel (DL-SCH) resource available for the relay node. This message may include a timing advance (TA) parameter to the relay node to adjust its uplink (UL) frame timing, Cell Radio Network Temporary Identity (C-RNTI) and uplink grant.

In an embodiment of the invention, the donor cell e-NB 20 can indicate that it can support a basic relay configuration for the donor cell eNB-RN link 26 in a radio resource control (RRC) procedure via System Information Block (SIB) on a Dynamic Broadcasting Channel (D-BCH) and that the configuration could be changed within a BCCH notification period. An example of the change in the notification period is illustrated in FIG. 4. The parameter changes may be e.g. transparent or non transparent relay, Time Duplexing relay, Frequency Duplexing relay, repeater (L0), Amplify and Forward (L1), Decode and Forward (L2), self-backhauling relay (L3), and so on. The relay System Information (SI) messages and mapping of SIBs to relay system information messages may be indicated e.g. in SystemInformationBlockType1 message with specified periodicity. The periodicity of the relay-specific system information message may be the same as the normal periodicity or different, e.g. a multiple thereof. Thus relay-specific system information may be transmitted less often and thus consume less bandwidth than ordinary system information, as the relay nodes can enter the system less often than ordinary user equipments and therefore there is less loss if they may have to wait a bit longer to collect the required system information.

In accordance with another embodiment of the invention, a donor cell eNB may notify attached L3 relay nodes of new relay configuration parameters by relay System Information (SI) message sent directly on Downlink Shared Channel (DL-SCH) using current PRBs reserved on the eNB-RN link. This may be done similarly as for the other data transmitted on this self-backhaul link. In case there are several relay nodes attached to the eNB cell, the eNB may broadcast these SIBs using same subset of PRBs common to all the backhaul links as indicated by a relay node SIB.

The transmission of this information can support a hybrid automatic repeat request (HARQ) mechanism. By means of the HARQ mechanism it is possible to remove need for any scheduling and fixed repetition as is done for example in LTE release 8 for P-BCH and D-SCH, in case the relay node cannot read SIB broadcasted on the backhaul link. The number of HARQ re-transmissions typically depends to some extent on the relay capability (e.g. multi-antenna, antenna tilting for transmission over the donor cell eNB-RN link) and topology (e.g. lower shadowing due to elevated position of the relay node with or without a line of sight to the donor cell eNB). This would further increase system information message detection, and hence transmission efficiency of these messages over the link. The relay system information message transmitted on the DL-SCH over the donor-cell eNB-RN link should be received and interpreted successfully by the relay node within a BCCH notification period.

In accordance with yet another embodiment, a donor cell eNB may change configuration of relay parameters in pseudo-static fashion via system information on the D-BCH in mid 6 PRBs or directly on DL-SCH on the backhaul link. For example, the donor cell eNB may request all newly powered on relays on D-BCH to configure themselves in amplify forward (AF) mode and all relays attached to the cell on downlink (DL) SCH to switch from decode forward (DF) to amplify forward (AF) mode in synchronous fashion at the beginning of a new BCCH notification period. This may be done depending on use case.

In another exemplifying embodiment, emergency or temporary coverage may require two-hops or multi-hops with L2 or L3 relay types. In yet another example, the donor cell eNB may request some relays to go in idle state and indicate by system information (SI) message to remaining relays that only L1 or L3 relay configurations apply in the cell to provide minimum coverage and save on energy cost at night. These events are not expected to change on a rapid basis and may be topology dependent. The relay node may register with network as a relay with all relevant parameters. For example, parameters such as antenna configuration, relay capability, Tx power and so on may be registered.

It can be assumed that the updating of system information over the backhaul link can be done during BCCH notification period set by RRC. The donor can set larger BCCH notification period in radio frames. For example, the notification period can be set as notification period=modificationPeriodCoeff*defaultPagingCycle If the modificationPeriodCoeff parameter is 1, 2, . . . , 8 and defaultPagingCycle parameter is 32, 64, 128, 256, the maximum notification period can be up to 8×256=2048 radio frames or about 2 seconds. This is believed to be sufficiently large for backhaul link delay on the DL-SCH.

If the relay node is a L3 type relay, it can transmit its own system information to RN-attached user equipments or user equipments performing initial RN-cell access. If needed some system information broadcasted by the donor cell eNB may be also broadcast by the relay node, assuming a relatively large BCCH notification period.

Figure 8A:
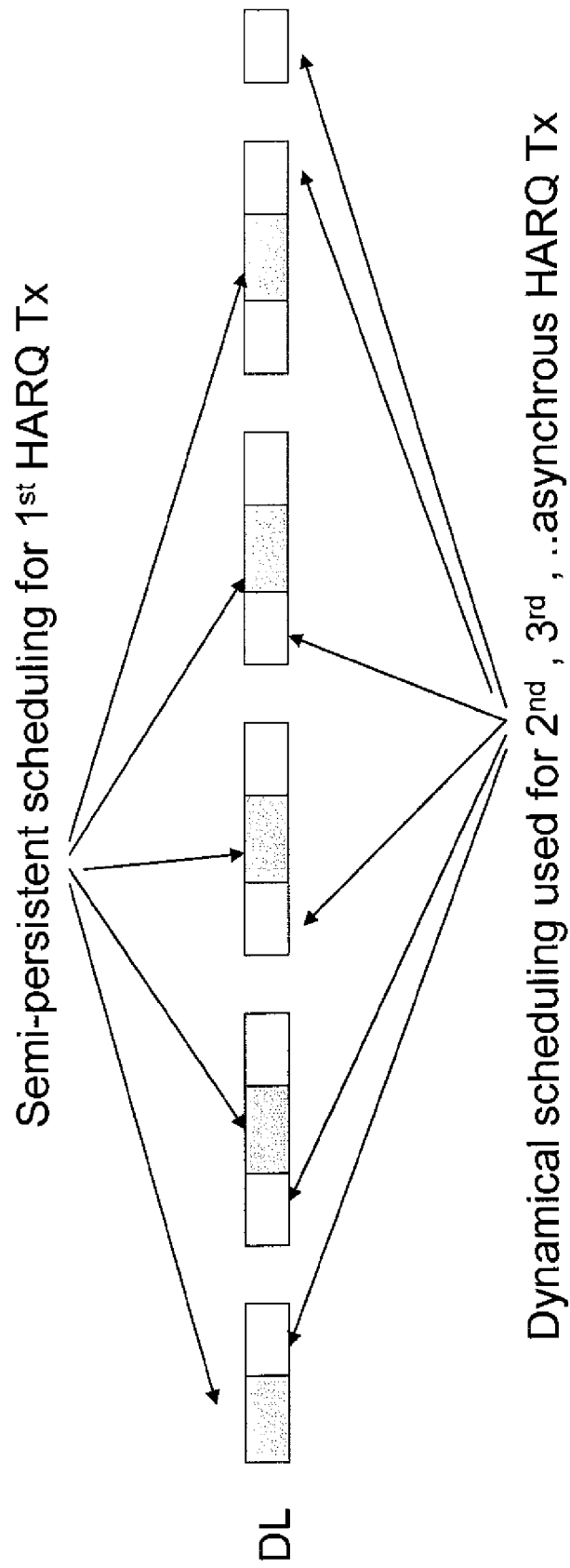
FIGS. 8*a* and 8*b* show examples for scheduling.
Figure 8B:
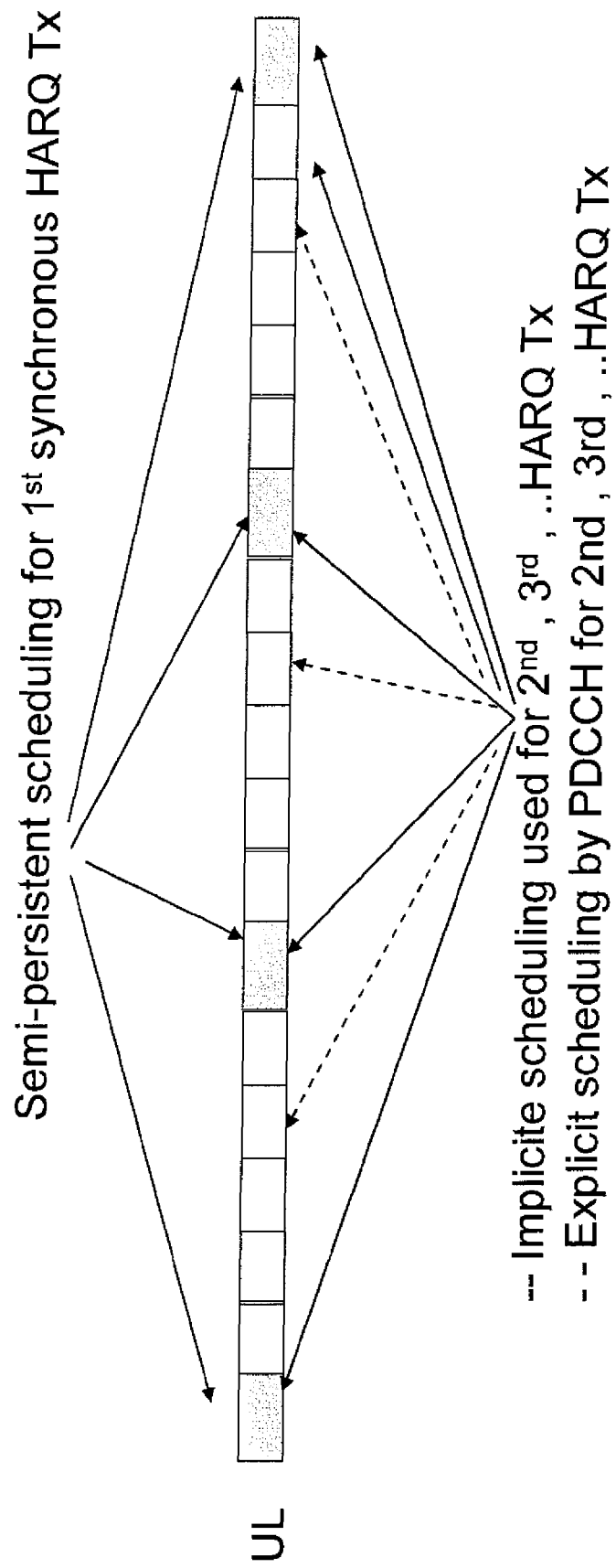

Certain possibilities for resource allocation and HARQ for a link between a donor-cell eNB and a relay node on DL-SCH and UL-SCH by the donor-cell eNB will be discussed next with reference to FIGS. 8a and 8b.

In accordance with an embodiment of the invention, a donor cell e-NB may allocate downlink (DL) and uplink (UL) grant resources to a relay node for donor cell eNB-RN link using semi persistent packet scheduling for the first HARQ transmission to the relay node (RN). Examples for the semi persistent scheduling are illustrated in FIGS. 8a and 8b. The amount of resources allocated to the donor cell eNB-RN link on the DL-SCH and UL-SCH can depend on needs. For example, allocation may depend on traffic load, number of user equipments attached to relay, how good the relay node-user equipment (RN-UE) links are, ands so on.

The relay node can be configured for semi-persistent scheduling by RRC with MAC-Main Configuration control information element. This information element includes the periodicity of the semi-persistent downlink (DL) and uplink (UL) grants for the relay node.

Semi-persistent scheduling command including Modulation Coding Scheme (MCS) configuration on the DL-SCH and UL-SCH can be triggered by PDCCH in the relay node.

The configuration can be such that the relay node does not need to expect any new PDCCH with its C-RNTI. This can be advantageous as this saves Physical Downlink Control Channel (PDCCH) resources. The donor cell eNB may semi-persistently schedule PRBs for donor cell eNB-RN link for downlink (DL) and uplink (UL) every sfx subframes, where the parameter sfx may be e.g. 10, 20, etc. The donor cell may also semi-persistently or dynamically schedule PRBs for donor-cell-attached user equipments in subframes used for the donor cell eNB-RN link. Effectively this means that the donor cell attached user equipments and the relay node are Frequency Division Multiplexed in these subframes.

Asynchronous downlink (DL) HARQ retransmissions to the relay node can be explicitly signalled via the PDCCH(s). That is, the retransmissions can be dynamically scheduled by the donor cell eNB. Uplink (UL) HARQ retransmissions by the relay node can be implicitly allocated in which case the user equipment uses the semi-persistent uplink allocation, or explicitly allocated via PDCCH in which case the user equipment does not follow the semi-persistent allocation.

In accordance with an embodiment, explicit allocation means that asynchronous uplink (UL) HARQ can be used where uplink (UL) grants for retransmissions are explicitly allocated via PDCCH.

In another embodiment of the invention, a donor cell e-NB can allocate downlink (DL) and uplink (UL) grant resources to the relay node using dynamical packet scheduling for the first HARQ transmission and subsequent HARQ re-transmission(s) to relay node. This can allow more flexible resource allocation for the backhaul link. For example, in case no user equipment is attached to the relay node cell or there are no user equipments in RRC_CONNECTED mode in the relay node cell, semi-persistent scheduling may cause an un-necessary cost. The donor cell eNB may give uplink (UL) grant to the relay node via the PDCCH to allow Scheduling Request from the relay node in case resources for newly attached user equipments.

Another example of resource allocation relates to a situation where there may be several user equipments attached to a relay node in RRC_CONNECTED mode with small to moderate data traffic load that can be supported by the semi-persistent allocated resources for the backhaul link. For example, if there is a single user using Voice over the Internet Protocol (VoIP) services in the relay node coverage area, then on the link between the donor cell and the relay node (RN) there basically would also be the same traffic as for a single VoIP user. This type for traffic can be more efficiently scheduled with semi-persistent scheduling rather than explicit scheduling. This is so because the packet payload is so small that the overhead of scheduling grants on the PDCCH becomes excessive. However, if many user equipments are connected to the relay node, all of them having VoIP traffic, then traffic of several user equipments can be multiplexed together, and then semi-persistent scheduling may not be needed as the relative overhead decreases.

The path loss and shadowing are expected to be relatively constant for fixed relays. Slow fading may be experienced on the donor cell eNB-relay node link. The eNB of the donor cell may optimise packet scheduling on the backhaul link to obtain a good compromise between the donor cell eNB signalling overhead to support relays in a semi-persistent or dynamical resource allocation scheduling on the one hand and allocating best PRBs with dynamical scheduling. For example, there can be 10-20 relays per cell typically depending on the size and number of donor cells in the network. The optimization may be provided by means of a packet scheduler.

An advantage of using semi persistent scheduling on the link between the donor dNB and the relay is now explained. As described above, relay nodes do have to spend some of their resources to transmit towards their attached user equipments, and during this time cannot listen to signals from the donor cell eNB. Thus some control signalling may be lost. Due to this limitation, a relay may not be able to receive the control signalling that is defined currently, because this signalling (CCPCH) is typically transmitted at the very beginning of a subframe. Consequently, new or modified signalling needs to be designed. However, such signalling may cause additional overhead. Semi persistent scheduling allows use of less scheduling messages to obtain the scheduling, and therefore the impact of such new scheduling messages on overall system design and the associated overhead can be minimized.

The following discusses resource control flow and resource release on the donor-cell eNB-RN link on DL-SCH and UL-SCH by way of examples.

In accordance with an embodiment, the amount of resources allocated to a donor cell eNB-RN link can be determined by a rate/flow control mechanism that takes into account the realisable data rates between the relay node and the user equipments, while minimising the buffer requirements for stored data at the relay node (RN) intended to the user equipments (UEs) but not yet delivered across the RN-UE link. Hence, for a users, the actual data rate transmitted between the donor cell e-NB and the relay node RN $R_{eNB \to RN\_UEi}$ should be decided by considering both the estimated supportable data rate from the relay node to this user$^i$ ($R_{RN \to UEi}$) and the stored data in the relay node buffer ($D_{RN\_Buffer\_UEi}$) for this user. The total data rate between donor cell e-NB and the relay node can be decided based on information of all user equipments (UE) connected to this relay node. For example, if there are N UEs connected to the relay node, then the following steps can be carried out:

It can be determined that within a defined time window T there is un-balanced data transmission capability between eNB-RN and RN-UE. This can be determined, for example, based on the function below. In this function & may be a network defined parameter for flow/rate control.

$$\frac{\sum_{i}^{N} R_{FRN \to RUEi} \cdot T}{\sum_{i}^{N} R_{eNB \to RN\_UEi} \cdot T + \sum_{i}^{N} D_{RN\_Buffer\_UEi}} \le \&,$$

where & may be a network defined parameter for flow/rate control.

Upon determination of the un-balanced data transmission capability, the relay node can report the total supported average data rate to eNB, for example by means of some dedicated or contention channel. Based on the received information, eNB can adopt a new data transmission rate for eNB-RN data transmission by re-allocating the resources between the eNB and the relay node.

This procedure can be carried out periodically with the defined time period T. The data rate report signalling between the relay node and donor cell eNB can also be event triggered.

The relay node decodes physical downlink control channel (PDCCH) in the sub-frames where the user equipment has semi-persistent downlink resource or uplink resource. If the relay node finds its C-RNTI on the PDCCH(s), the PDCCH allocation can override the semi persistent resources allocated to donor cell eNB-RN link on downlink synchronisation channel (DL-SCH) or uplink synchronisation channel (UL-SCH) are released. The relay node may set a periodic buffer status request (BSR) Timer with parameter PERIODIC_BSR_TIMER with value in number of sub-frames giving the Buffer Status request periodicity to check buffer in the RN-attached user equipments. Likewise, the relay node may schedule uplink (UL) grants to allow relay node attached user equipments to make a Scheduling Request for new resources.

In accordance with an embodiment the relay node computes an average of packets/new resource schedule requests in the user equipment buffers. The relay node may then report this to the donor cell eNB through similar Buffer Status request and Scheduling Request. If the relay node buffer is empty, then there apparently is no need for uplink (UL) grants for backhaul link. Uplink (UL) grants for relay node schedule request may be sufficient. If there is no schedule request for data, then the eNB may continue allocating uplink (UL) grants for scheduling request to allow the relay node to keep in RRC_CONNECTED mode or de-allocate resources (no UL grant), which effectively kicks the relay node in RRC_IDLE mode.

The following will discuss, by way of an example, initial cell access to a relay node (RN) cell by user equipments (UEs).

Having synchronised to the donor cell eNB, registered with the network, acquired relay configuration parameters and being assigned downlink (DL) and uplink (UL) resources for the donor cell eNB-RN link from the donor cell eNB, the relay node (RN) can stop receiving mode in mid-6 PRBs broadcast by the donor cell. The relay node can now start its own transmission of common and shared signalling. For example, P/S-SCH for user equipment synchronisation to the relay node, transmission of common reference symbol (CRS) or dedicated reference symbols (DRS) for relay node attached user equipments, and broadcasting of system information on BCH for relay node attached user equipments can now take place.

As the system information messages are transmitted over the donor cell eNB RN link, it is not necessary to use 1 ms subframe offset. There is no self-interference between reception of the donor cell eNB transmitted PID-BCH in the relay node and the transmission by the relay node of its own PID-BCH at the same time. This is so because the relay node does not listen to the donor cell eNB transmitted PID-BCH in the mid-6 PRBs anymore as was the case during the initial donor cell eNB-RN link setup.

There may be instances where the relay does not listen to the time when these signals/information is received, rather than the frequency range. As these are from the operation principles similar scenarios they will not be discussed individually.

In the similar manner as is the case in the user equipment, the relay node can maintain downlink (DL) synchronization to the donor cell eNB by using reference signals transmitted by the donor cell eNB without needing to detect P/S-SCH. Likewise, the donor cell eNB can maintain uplink (UL) synchronization with the relay node, including timing advance (TA) command, using similar procedure as is typically used for a user equipment (UE).

The relay node can effectively behave like an ordinary eNB from now on as far as the relay node attached user equipments are concerned. These user equipments may effectively see the relay node as another eNB (with its own cell identity (cell ID). For example, a handover procedure as it would be with the eNB 20 of FIG. 1 can be used. The relay node carries out packet scheduling and link adaptation to relay-attached user equipments, with the donor cell taking no active part in the proceedings. This can include operations such as transmission of PCFICH, PDCCH, PHICH control signalling channels and PDSCH data channel on the downlink (DL) and interpretation of the PUCCH control signalling channel and PDSCH data channel on the uplink (UL).

Uplink (UL) timing alignment will be discussed next. As the relay node can be either outside the donor cell eNB coverage or inside the donor cell eNB coverage, these are considered separately.

Uplink (UL) timing alignment for a scenario where the relay node is outside the donor cell eNB coverage is discussed first. In this regard a reference can again be made to FIG. 1. The donor cell eNB 20 attached user equipments 21 can be outside the coverage of the relay node cell 11, and vice versa. However, even if the location of the relay node 10 is such that it is considered as being outside of the coverage, the relay node 10 can still be within the donor cell eNB coverage for the purposes of the wireless backhaul link 26. This can be achieved, for example, through antenna tilting, because of shadowing link gain due to better positioning and so on.

In accordance with an embodiment, a unicast subframe can be used on the donor-cell eNB-RN link 26. This has the short cyclic prefix (CP) in most scenarios and hence can have a higher frame efficiency than if a longer CP is used.

A frame structure type that is applicable to LTE TDD is illustrated in FIG. 9. The guard period (GP) allows user equipments to align their uplink (UL) timing transmission to the eNB 20. A timing advance (TA) parameter is computed in the eNB 20 based on radio access channel (RACH) transmission from the user equipment. The eNB can then send the TA parameter in a Random Access response message to the user equipment 1. The user equipment can then advance its uplink (UL) transmission time to compensate for the propagation delay to the eNB 20. The timing advance can be absorbed in the guard period (GP), which can have a minimum size of 2192 Ts (this is sufficient for cell radius of about 10 km). It takes typically less than 10 μs to switch from a Rx mode to a Tx mode in the user equipment hardware. This hardware switching time can be included in the guard period.

In FDD, a timing mechanism is also used. As FDD uses paired spectrum, the user equipment may adjust its uplink (UL) transmit timing without requiring a guard period (GP).

The relay node can align its uplink (UL) timing transmission time to the donor cell eNB during initial backhaul link set up procedure. As far as the backhaul link is concerned, the relay node can be seen as another donor-cell eNB attached user equipment and adequate timing synchronisation on the downlink (DL) and uplink (UL) can be assumed. Initial relay node cell access as would be by the user equipments may thus proceed. The user equipments can be in a line of sight (LOS) to the relay node and may all align their uplink (UL) transmit time to the relay node, but not at the same time, to the donor cell eNB. The relay node attached user equipment transmissions should not create any significant interference at the donor cell eNB due to the path loss, in particular because it can be assumed that the relay node attached user equipments are typically outside donor-cell coverage.

The uplink timing alignment in a case where the relay node is within the donor cell eNB coverage is considered next. In this example it is assumed that the donor cell eNB 20 and the relay node 20 attached user equipments 1 are Frequency Division Multiplexed and use different PRBs. The relay node can align its uplink timing transmission time to the donor cell eNB during initial backhaul link set up procedure. Initial relay node cell access by the user equipments may then proceed. The user equipments are in a line of sight condition to the relay node and may all align their uplink transmit time to the relay node. However, they cannot at the same time align to the donor cell eNB. Uplink (UL) transmission of the relay node attached user equipments 1 may interfere significantly with that of the donor cell eNB attached user equipments 21 due to difference in uplink (UL) timing alignment. The path loss experienced by the relay node cell attached user equipments cannot be expected to effectively alleviate the impact of the interference from these user equipments at the donor cell eNB since relay node attached user equipments are within the coverage of the eNB, and vice versa.

A solution to this is that the relay node 10 attached user equipments 1 align their uplink (UL) timing to the donor cell eNB 20 and truncation of the first and last SC-FDMA symbol in the subframe for the RN-UE link 26 is used. This allows to remove interference between donor-cell-eNB attached user equipments 21 and relay node attached user equipments 1 for cell radius of up to 10.714 km, based on round trip $d=c.t/2=3\times 108\times 71.42\times 10-6=10.714$ km.

In a LTE FDD terminal full-duplex capability is assumed and hence there is no issue with Rx to Tx mode switching time. In LTE TDD terminal, this Rx to Tx switching time is of the order of 10 μs and can be absorbed in the GP, as is the case for the timing advance. This solution comes at the cost of a 2/14=14% frame efficiency loss in the relay node. Due to backward compatibility, LTE release 8 terminals may not be able to handle the subframe truncation. On the other hand, LTE release 9 terminals can be expected to be specified to be enabled to do this.

In another solution the relay node attached user equipments align their uplink (UL) timing to the donor cell eNB and no truncation of the first and last SC-FDMA symbol in the subframe for the RN-UE link is used. The user equipments do not necessarily have to explicitly align their timing to the eNB, but instead the relay node can set the timing advance on the RN-UE link in a way that achieves the alignment at the eNB. In particular, if the distance between the relay node and the user equipment is small, then this is equivalent to set the timing advance of the RN-UE link to the timing advance of the eNB-UE link. The latter can provide a simple and efficient solution to get a reasonable alignment of uplink signals both at the relay node and the eNB.

This can be assumed to work without any major difficulty if the relay cell size is relatively small, preferably smaller than the donor cell. Fro example, the relay node may not be much bigger than the minimum TA resolution of 16*Ts=0.52 μs or 75 m round trip time.

In case relay cell size is rather large the uplink (UL) timing misalignment may become an issue. For such instances a procedure can be provided where the donor cell eNB and the relay node decide which of them should serve the particular user equipment, or if it would be better to assign the user equipment to another relay node or eNB. This implies that some mutual interference on the uplink (UL) by donor cell eNB and a relay node attached user equipments is allowed. There may be performance degradation of both donor cell eNB and relay node attached user equipments depending on their respective location and path loss. Some advance interference mitigation techniques may be designed to suppress partly the interference.

In certain applications it can be more practical that the relay node attached user equipments align their uplink timing to the donor cell eNB, as there may be several relay nodes within a donor cell. These user equipments would experience varied propagation delays to their respective relay nodes and their uplink transmissions may indeed arrive at significantly different times at the donor cell eNB.

The required data processing apparatus and functions of a relay node and a base station apparatus as well as an appropriate communication device may be provided by means of one or more data processors. The above described functions may be provided by separate processors or by an integrated processor. The data processing may be distributed across several data processing modules. A data processor may be provided by means of, for example, at least one chip. Appropriate memory capacity can also be provided in the relevant nodes. An appropriately adapted computer program code product or products may be used for implementing the embodiments, when loaded on an appropriate data processing apparatus, for example in a processor apparatus 13 associated with the base station 10 shown in FIG. 1 and/or a data processing apparatus of the station 20 of FIG. 1. The program code product for providing the operation may be stored on, provided and embodied by means of an appropriate carrier medium. An appropriate computer program can be embodied on a computer readable record medium. A possibility is to download the program code product via a data network.

It is noted that whilst embodiments have been described in relation to LTE, similar principles can be applied to any other communication system where relaying is employed. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method comprising:
   initiating a set up procedure for a communication link between a station of an access system and a relay node, the relay node being capable of wirelessly communicating with at least one communication device within the coverage thereof, wherein the relay node acts as a communication device towards the station and the set up procedure is initiated according to a set up procedure between the station and communication devices accessing the station directly; and
   communicating between the relay node and at least one communication device within the coverage area thereof, wherein the relay nodes acts as a station of an access system towards said at least one communication device;
   receiving, at the relay node in a first mode, first information based on a protocol for communication between the station and communication devices within the coverage of the station;
   synchronising the relay node with the station based on said first information;
   setting up the communication link;
   switching the relay node to a second mode for enabling the relay node to transmit second information for communications devices within the coverage of the relay node; and
   setting a timing advance on the communication link such that communication devices attached to the relay node are in alignment with the station.

2. A method as claimed in claim 1, further comprising maintaining synchronization of the relay node with the station based on common reference signals transmitted on the communication link after the setup thereof.

3. A method as claimed in claim 1, further comprising updating of configuration parameters of the relay node based on system information received via the communications link after the set up thereof.

4. A method as claimed in claim 1, wherein the first mode enables the relay node to receive system information and the second mode enables the relay node to transmit system information.

5. A method as claimed in claim 1, wherein the step of communicating between the relay node and at least one communication device comprises communication on a physical broadcast channel and primary/secondary synchronization channel between the relay node and the communication device.

6. A method as claimed in claim 1, further comprising aligning the uplink timing of relay node attached communication devices to the station by truncating at least one symbol in a subframe for communication on the communication link.

7. A method comprising:
   initiating a set up procedure for a communication link between a station of an access system and a relay node, the relay node being capable of wirelessly communicating with at least one communication device within the coverage thereof, wherein the relay node is treated as a communication device accessing the station and the set up procedure is initiated according to a set up procedure between the station and communication devices accessing the station directly;
   setting up the communication link between the relay node and the station;
   transmitting information based on a protocol for communication between the station and communication devices within the coverage of the station;
   synchronising with the relay node based on the information; and
   determining a timing advance parameter and communicating the parameter to a communication device for use in compensating a delay cause by the relaying.

8. A method as claimed in claim 7, wherein the information comprises a relay-specific system information message.

9. A method as claimed in claim 7, further comprising transmitting relay configuration parameters to indicate if at least one of transparent/non-transparent relay, time duplexing or frequency duplexing relay modes, repeater, amplify and forward, decode and forward, self-backhauling relays are supported.

10. An apparatus comprising:
    at least one processor; and
    at least one memory including computer program code the at least one memory and the computer program code configured to, with the at least one processor, cause the apparatus to perform at least the following:
    initiate a set up procedure for a communication link between a station of an access system and at least one communication device wirelessly communicating with a relay node, wherein the relay node acts as a communication device towards the station and the set up procedure is initiated according to a set up procedure between the station and communication devices accessing the station directly;
    control communications between the relay node and the at least one communication device within the coverage area thereof, wherein the relay nodes acts as a station of an access system towards said at least one communication device;
    switch the relay node between a first mode and a second mode, and wherein the relay node is configured, when in the first mode, to receive first information based on a protocol for communication between the station and communication devices within the coverage of the station and to synchronise with the station based on said first information, and, when in the second mode, to transmit second information for communications devices within the coverage of the relay node; and
    maintain synchronization of the relay node with the station based on common reference signals transmitted on the communication link after the setup thereof.

11. An apparatus as claimed in claim 10, wherein the apparatus is caused to further perform: update configuration parameters of the relay node based on system information received via the communications link after the set up thereof.

12. An apparatus as claimed in claim 10, wherein the first mode enables the relay node to receive system information and the second mode enables the relay node to transmit system information.

13. An apparatus as claimed in claim 12, wherein the system information is communicated on mid 6 physical resource blocks on a broadcast control channel.

14. An apparatus as claimed in claim 10, wherein the apparatus is caused to perform: communicate at least frequency division duplex and time division duplex transmissions on the communication link.

15. An apparatus comprising:
    at least one processor; and
    at least one memory including computer program code the at least one memory and the computer program code configured to, with the at least one processor, cause the apparatus to perform at least the following:
    initiate a set up procedure for a communication link between a station of an access system and a relay node, the relay node being capable of wirelessly communicating with at least one communication device within the coverage thereof, wherein the relay node is treated as a communication device accessing the station and the set up procedure is initiated according to a set up procedure between the station and communication devices accessing the station directly;
    set up the communication link between the relay node and the station;
    transmit information based on a protocol for communication between the station and communication devices within the coverage of the station; and
    synchronise with the relay node based on said information; and
    determine a timing advance parameter and communicating the parameter to a communication device for use in compensating delay caused by the relaying.

16. An apparatus as claimed in claim 15, wherein the apparatus is caused to further perform: transmit updated configuration parameters via the communication link.

* * * * *